United States Patent [19]
Takahashi et al.

[11] Patent Number: 6,118,736
[45] Date of Patent: Sep. 12, 2000

[54] MAGNETO-OPTICAL RECORDING MEDIUM HAVING A READING LAYER IN WHICH TRANSFERRED RECORDING MARKS ARE EXTENDED

[75] Inventors: Koyata Takahashi; Koji Katayama, both of Kanagawa, Japan

[73] Assignee: Tosoh Corporation, Yamaguchi, Japan

[21] Appl. No.: 09/160,350

[22] Filed: Sep. 25, 1998

[30] Foreign Application Priority Data

Sep. 25, 1997 [JP] Japan ................................. 9-259783

[51] Int. Cl.[7] ...................................................... G11B 11/00
[52] U.S. Cl. ........................... 369/13; 428/694 ML; 428/694 MM
[58] Field of Search ............................... 369/13, 14, 110, 369/116; 360/59, 114; 365/122; 428/694 ML, 694 RE, 694 MM

[56] References Cited

U.S. PATENT DOCUMENTS

| | | | |
|---|---|---|---|
| 5,623,458 | 4/1997 | Matsumoto et al. | 369/13 |
| 5,627,803 | 5/1997 | Negishi | 369/13 |
| 5,633,838 | 5/1997 | Hirokane et al. | 369/13 |
| 5,684,764 | 11/1997 | Hirokane et al. | 369/13 |
| 5,723,227 | 3/1998 | Matsumoto et al. | 369/13 |
| 5,754,500 | 5/1998 | Tanaka et al. | 369/13 |
| 5,838,645 | 11/1998 | Hirokane et al. | 369/13 |
| 5,879,822 | 3/1999 | Okada | 428/694 RE |
| 5,896,350 | 4/1999 | Tamanoi et al. | 369/13 |

FOREIGN PATENT DOCUMENTS 0 618 572 A2   5/1994   European Pat. Off. .

*Primary Examiner*—Tan Dinh
*Attorney, Agent, or Firm*—Sughrue, Mion, Zinn, Macpeak & Seas, PLLC

[57] ABSTRACT

A magneto-optical recording medium and a reading method thereof are disclosed, in which the reading output is hardly reduced even in bits written at sufficiently narrower intervals than the optical diffraction limit of light for reading. The magneto-optical recording medium is that in an area the temperature of which has become not lower than a first predetermined temperature by radiation of a reading laser beam, a reading layer becomes a perpendicularly magnetized film, while recording marks in a recording layer are transferred to the reading layer, and these recording marks transferred to the reading layer are extended in the reading layer in an area the temperature of which has reached a second predetermined temperature or more.

11 Claims, 4 Drawing Sheets

38
37
36
35
34
33
32
31

47
46
45
44
43
42
41

MAGNETO-OPTICAL RECORDING MEDIUM HAVING A READING LAYER IN WHICH TRANSFERRED RECORDING MARKS ARE EXTENDED

FIELD OF THE INVENTION

The present invention relates to a magneto-optical recording medium for recording, reading and erasing information by using light. Particularly, it relates to a magneto-optical recording medium which can read superfine recording marks, and a method of reading the magneto-optical recording medium.

BACKGROUND OF THE INVENTION

In order to realize magneto-optical recording with a higher content, a magnetic super-resolution reading system is proposed as a method of reading information recorded in a size not larger than an optical diffraction limit of light for reading (for example, JP-A-1-143041, JP-A-1-143042, etc.). (The term "JP-A" used herein means an unexamined and published Japanese patent application). In this method, at least a reading layer and a recording layer are used. Of a beam spot irradiated by reading light, a fixed area is used as a mask so as to obtain an effect substantially similar to that in the case where the beam spot is made smaller. This utilizes the fact that there is a distribution of intensity of light in the beam spot, and the fact that the temperature rising elevation is larger in the rear than in the front in the advancing direction of the beam.

As for such a method, there is a method using the fact that the reading layer is an in-plane magnetized film at room temperature so that information recorded in the recording layer is masked, and the reading layer becomes a perpendicularly magnetized film in an area where the temperature has reached or exceeded a predetermined value, so that the information recorded in the recording layer is transferred to the reading layer (for example, JP-A-5-81717). In this method, crosstalk with an adjacent track is very small because the reading layer is in the in-plane magnetization state also in the adjacent track.

According to this method, it is possible to reproduce bits recorded at a certain degree of narrower intervals than an optical diffraction limit of light for reading. However, there has been a problem that as the bit intervals are made to be narrower, the size of the bits becomes so small that the output is extremely lowered to thereby make the reading impossible.

SUMMARY OF THE INVENTION

In a magnetic super-resolution medium using a magnetic layer which is an in-plane magnetized film at room temperature as a reading layer, one object of the present invention is to provide a magneto-optical recording medium in which the reading output is hardly lowered even in bits written at sufficiently narrower intervals than an optical diffraction limit of light for reading.

Another object of the present invention is to provide a method of reading such a magneto-optical recording medium.

As a result of repetitive studies with enthusiasm, the present inventors have found that if an in-plane magnetized film with transition metal preference is laminated on a reading layer which is an in-plane magnetized film at room temperature but which becomes a perpendicularly magnetized film when the temperature rises, recording marks generated in the reading layer can be extended easily, and that, by using the above-mentioned fact, the recording marks transferred from a recording layer to the reading layer by the effect of an exchange coupling force or a magneto-static force from the recording layer can be read while being extended to an area the temperature of which has reached or exceeded a predetermined temperature at the same time when the reading layer becomes a perpendicularly magnetized film by the temperature rising caused by a reading laser beam. Thus, the present inventors accomplished the present invention.

That is, according to one embodiment of the present invention, there is provided a magneto-optical recording medium comprising a reading layer, an intermediate layer and a recording layer each of which is made from a rare-earth transition metal alloy and formed on a substrate, wherein the reading layer is an in-plane magnetized film at a lower temperature than a first predetermined temperature, and becomes a perpendicularly magnetized film when the temperature rises to reach or exceed the first predetermined temperature, the intermediate layer is an in-plane magnetized film with transition metal preference, and the recording layer is a perpendicularly magnetized film, and wherein the magnetization of the reading layer is directed to the in-plane direction independently of the direction of the magnetization of the recording layer so that the reading layer becomes a mask in a temperature range lower than the first predetermined temperature, while in an area the temperature of which has reached a temperature which is not lower than the first predetermined temperature but lower than the second predetermined temperature by the temperature rising caused by radiation of a reproduction laser beam, the reading layer becomes a perpendicularly magnetized film, whereby recording marks recorded in the recording layer are transferred to the reading layer, and the recording marks transferred to the reading layer are further extended to the reading layer which is in an area the temperature of which has risen to a temperature not lower than the second predetermined temperature.

According to another embodiment of the present invention, there is provided a magneto-optical recording medium comprising a reading layer, an intermediate layer and a recording layer each of which is made from a rare-earth transition metal alloy and formed on a substrate, wherein: the reading layer is an in-plane magnetized film at a temperature lower than the first predetermined temperature, while it becomes a perpendicularly magnetized film when the temperature rises to or exceeds the first predetermined temperature; the intermediate layer is an in-plane magnetized film with transition metal preference, the Curie temperature of the intermediate layer being higher than the first predetermined temperature, but lower than the Curie temperature of the recording layer; and the recording layer is a perpendicularly magnetized film. In this case, preferably, the reading layer is of an alloy consisting of GdFeCo as a main component with rare earth preference, and the composition of the intermediate layer is expressed by $Gd_xFe_{1-x-y}M_y$ (M is a non-magnetic metal element), satisfying $0.08 \leq x \leq 0.20$, and $0 \leq y \leq 0.15$.

According to a further embodiment of the present invention, there is provided a magneto-optical recording medium comprising a reading layer, an intermediate layer, a cut-off layer, and a recording layer each of which is made from a rare-earth transition metal alloy and formed on a substrate, wherein: the reading layer is an in-plane magnetized film at a temperature lower than the first predetermined temperature, while it becomes a perpendicularly magnetized film when the temperature rises or exceeds the first predetermined temperature; the intermediate layer is an in-plane magnetized film with transition metal preference; the cut-off layer is a perpendicularly magnetized film, the Curie temperature of the cut-off layer being higher than the first predetermined temperature but lower than the Curie temperature of the recording layer; and the recording layer is a perpendicularly magnetized film. In this case, preferably, the reading layer is made of an alloy comprising GdFeCo as a main component with rare earth preference, and the composition of the intermediate layer is expressed by $Gd_xFe_{1-x-y}M_y$ (M is a non-magnetic metal element), satisfying $0.08 \leq x \leq 0.20$, and $0 \leq y \leq 0.15$, while the Curie temperature of the cut-off layer is not lower than 100° C., but lower than the Curie temperature of the recording layer by 50° C. or more.

The magneto-optical recording medium according to the present invention is characterized in that in an area the temperature of which is lower than the first predetermined temperature, the magnetization of the reading layer is directed to the in-plane direction independently of the direction of magnetization of the recording layer so that the reading layer becomes a mask, while in an area the temperature of which has risen to a temperature not lower than the first predetermined temperature but lower than the second predetermined temperature by the temperature rising caused by radiation of a reading laser beam, the reading layer becomes a perpendicularly magnetized film, whereby an exchange coupling force or a magneto-static force from the recording layer operates so that recording marks recorded in the recording layer are transferred to the reading layer, and these recording marks transferred to the reading layer are extended to the reading layer in an area the temperature of which has reached a temperature not lower than a second predetermined temperature. In the case of the above-mentioned magneto-optical recording medium, the second predetermined temperature is equal to or close to the Curie temperature of the intermediate layer or the cut-off layer.

According to a still further embodiment of the present invention, there is provided a method of reading a magneto-optical recording medium, wherein, in an area the temperature of which is lower than the first predetermined temperature, the magnetization of a reading layer is directed to the in-plane direction independently of the direction of the magnetization of a recording layer so that the reading layer becomes a mask for recording marks recorded in the recording layer in advance, while in an area the temperature of which has risen to a temperature not lower than the first predetermined temperature but lower than a second predetermined temperature by radiation of a reading laser beam, the reading layer is made a perpendicularly magnetized film while the recording marks recorded in the recording layer are transferred to the reading layer, and the recording marks transferred to the reading layer are further extended to the reading layer which is in an area the temperature of which has risen to a temperature not lower than the second predetermined temperature to thereby obtain a readout signal.

Figure 1:
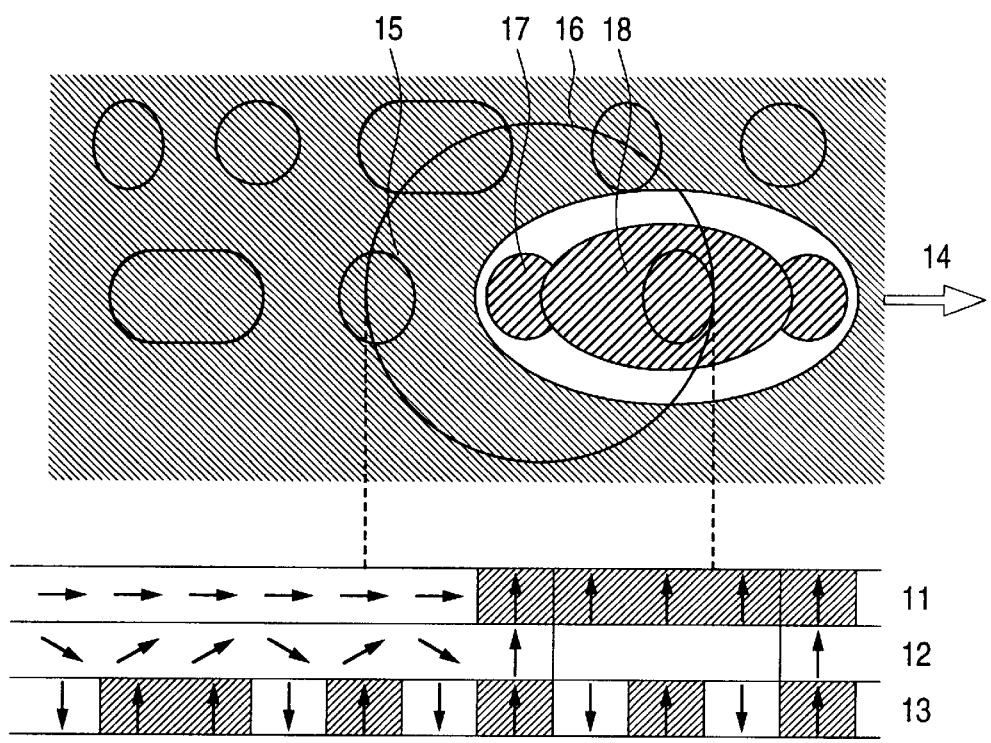
FIG. 1 is a conceptual view showing an example of a method of reading a magneto-optical recording medium according to the present invention.

In the drawings:
11,21: Reading layer
12,22: Intermediate layer
13,23: Recording layer
14,24: Medium advancing direction
15,25: Mask area
16,26: Reading beam spot
17,27: Transfer area
18,28: Extension area
31,41,81: Substrate
32,43,82: Dielectric layer
33,46,83: Reading layer
34,45,84: Intermediate layer
85: Cut-off layer
35,44,86: Recording layer
36,47,87: Dielectric layer
37,42,88: Thermal diffusion layer
38,89: Resin protective layer
51: Reading power dependency of C/N in Example 1
52: Reading power dependency of C/N in Comparative Example 1
61: Readout waveform in a reading magnetic field of −50 Oe
62: Readout waveform in a reading magnetic field of −50 Oe.
63: Readout waveform in a reading magnetic field of +50 Oe.

DETAILED DESCRIPTION OF THE INVENTION

The present invention is described in detail below.

Figure 2:
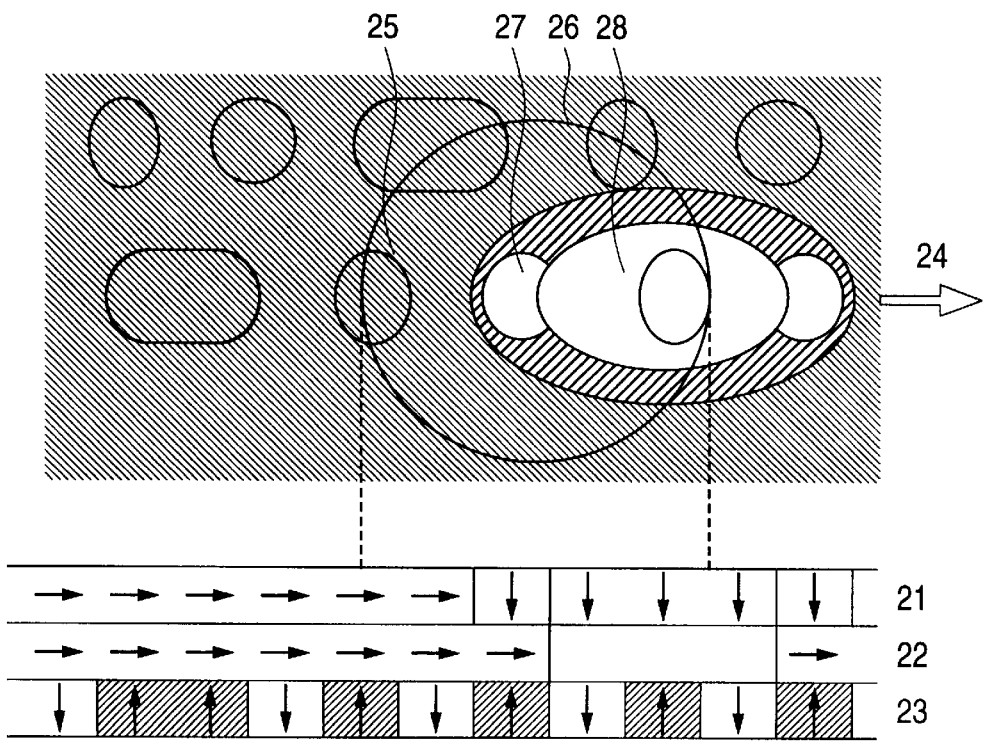
FIG. 2 is a conceptual view showing another example of a method of reading a magneto-optical recording medium according to the present invention.

FIGS. 1 and 2 are basic conceptual views showing a reading system of a magneto-optical recording medium according to the present invention. FIG. 1 shows an example when recording marks recorded in a recording layer are transferred-to a reading layer by an exchange coupling force, and FIG. 2 shows an example when recording marks recorded in a recording layer are transferred to the reading layer by a magneto-static force. In the drawings, the arrows in the respective layers indicate the directions of spin of transition metal elements. Whether the recording marks recorded in the recording layer are transferred to the reading layer by the exchange coupling force or by the magneto-static force depends on the thickness of an intermediate layer, the degree of magnetization of the intermediate layer, and so on. The magneto-static force acts more largely as the intermediate layer is thicker and the degree of magnetization of the same is larger.

The embodiment is now described in which the recording marks recorded in the recording layer are transferred to the reading layer by the exchange coupling force as shown in FIG. 1 as an example. Information is recorded on the basis of the length of marks in advance, in a magneto-optical recording medium constituted by a lamination of: a reading layer 11 which is an in-plane magnetized film at room temperature but becomes a perpendicularly magnetized film when the temperature rises; an intermediate layer 12 which is an in-plane magnetized film with transition metal preference; and a recording layer 13 which is a perpendicularly magnetized film having a large magnetic coercive force. In a mask area 15 having a lower temperature than the first predetermined temperature in a reading beam spot 16, the reading layer 11 is an in-plane magnetized film, and the exchange coupling from the recording layer 13 is weakened by the intermediate layer 12 which is an in-plane magnetized film, so that the spin of the reading layer 11 is practically directed substantially to the in-plane direction. In a transfer area 17 the temperature of which is in a range of from the first predetermined temperature to a second predetermined temperature, the reading layer 11 becomes a perpendicularly magnetized film, and the direction of the spin of the reading layer 11 is set in parallel with the direction of the spin of the recording layer 13 by the exchange coupling force, so that recording marks recorded in the recording layer 13 are transferred to the reading layer. Further, in an extension area 18 the temperature of which is not lower than the second predetermined temperature, the exchange coupling between the recording layer 13 and the reading layer 11 is broken because the temperature in this area is higher than the Curie temperature of the intermediate layer 12, so that, independently of the recording marks recorded in the recording layer 13, a magnetic domain transferred to the reading layer in the transfer area 17 is extended to the reading layer in the extension area because of movement of a magnetic domain wall caused by a magnetic domain wall energy gradient based on a temperature gradient.

FIG. 2 shows an example when recording marks recorded in a recording layer are transferred to a reading layer by a magneto-static force. Information is recorded on the basis of the length of marks in advance, in a magneto-optical recording medium constituted by a lamination of: a reading layer 21 which is an in-plane magnetized film at room temperature but becomes a perpendicularly magnetized film when the temperature rises, an intermediate layer 22 which is an in-plane magnetized film with transition metal preference; and a recording layer 23 which is a perpendicularly magnetized film having a large magnetic coercive force. In a mask area 25 having a lower temperature than the first predetermined temperature in a reproduction beam spot 26, the reading layer 21 is an in-plane magnetized film, and the exchange coupling from the recording layer 23 is weakened by the intermediate layer 22 which is an in-plane magnetized film, so that the spin of the reading layer 21 is directed substantially to the in-plane direction. In a transfer area 27 the temperature of which is in a range of from the first predetermined temperature to a second predetermined temperature, the reading layer 21 becomes a perpendicularly magnetized film. However, the in-plane anisotropy of the intermediate layer 22 gets stronger with rising of the temperature, so that the exchange coupling hardly operates. Therefore, in the transfer area 27, the direction of magnetization of the reading layer 21 is set in parallel with the direction of magnetization of the recording layer 23 by the magneto-static coupling force, so that recording marks recorded in the recording layer 23 are transferred to the reading layer. Rare earth preference is preferable for the reading layer. With the rare earth preference, the direction of the spin of the reading layer 21 is in reverse-parallel with the direction of the spin of the recording layer 23. Further, in an extension area 28 the temperature of which is not lower than the second predetermined temperature, the magneto-static coupling connection between the recording layer 23 and the reading layer 21 is broken because the temperature in this area is higher than the Curie temperature of the intermediate layer 22. Therefore, independently of the recording marks recorded in the recording layer 23, a magnetic domain transferred to the reading layer in the transfer area 27 is extended to the reading layer in the extension area because of movement of a magnetic domain wall caused by a magnetic domain wall energy gradient based on a temperature gradient.

Regarding a reading magnetic field, a range of the magnetic field in which recording marks are extended stably exists near the zero magnetic field. Reading can be generally made with a low magnetic field of about 100 Oe.

In this reading system, the amplitude of a readout signal corresponds to a variation of a Kerr rotation angle of the transfer area and the extension area. Accordingly, the signal amplitude in the extension area is ensured even if recorded marks are made small. In addition, the transfer area 17 or 27 becomes narrower than the beam spot both in the disk movement direction and in the radial direction, so that both the resolution and the crosstalk are improved.

The recording layer in the present invention is not particularly limited so long as it is a perpendicularly magnetized film of a rare earth transition metal alloy. However, as the coercive force is large, the retentivity for recording is preferably good. Therefore, it is preferable to use a material consisting of TbFeCo or DyFeCo, or consisting of TbFeCo or DyFeCo as a main component to which any of rare earth components such as Nd, Ho, Sm, etc., or any of corrosion-resistant elements such as Cr, Ti, Zr, Nb, Ta, etc., is added. The thickness of the recording layer is preferably 30 nm or more in view of stability and magneto-static coupling force. To give a proper value to the recording sensitivity, the thickness is preferably set to be 200 nm or less.

The reading layer is not particularly limited so long as it is of a rare earth transition metal alloy which is an in-plane magnetized film at room temperature which becomes a perpendicularly magnetized film when the temperature rises. However, in order to satisfy such properties, rare earth preference is preferable. It is preferable that the transformation from the in-plane magnetized film to the perpendicularly magnetized film is caused at the temperature in a range of from 100 to 200° C., more preferably from 120 to 180° C. In addition, it is preferable that the coercive force is smaller. Therefore, it is preferable to use a material consisting of GdFeCo, or consisting of GdFeCo as a main component to which any of rare earth components such as Nd, Dy, Ho, Tb, Sm, etc., or any of corrosion-resistant elements such as Cr, Ti, Zr, Nb, Ta, etc., is added. Preferably, the thickness of the reading layer is set to be not smaller than 10 nm in order to ensure a Kerr rotation angle, and not larger than 100 nm in order to give a proper value to the recording sensitivity. More preferable reading properties can be obtained if the thickness is set to be not smaller than 20 nm but not larger than 50 nm.

It is necessary that the intermediate layer is made from a rare earth transition metal alloy and is an in-plane magnetized film with rare earth transition metal preference. It is preferable that the coercive force is smaller, and it is therefore preferable to use, for example, a material consisting of GdFe, GdFeCo, GdDyFeCo, or GdNdFeCo, or consisting of GdFe, GdFeCo, GdDyFeCo, or GdNdFeCo as a main component to which any of non-magnetic elements such as Al, Si, Cr, Ti, Zr, Nb, Ta, etc., is added.

Although a magnetic film which is an in-plane magnetized film in a range of from room temperature to the Curie temperature can be made from a rare earth transition metal alloy by making the rare earth content higher than that in the reading layer, in the case of an intermediate layer with rare earth preference, recording marks transferred to the reading layer are reduced easily to disappear when the exchange coupling or the magneto-static coupling is broken. This is because, in the reading layer with rare earth preference, the magnetization becomes smaller as the temperature rises so that the shrinking force of a magnetic wall around a recording magnetic domain increases. This tendency does not change even if the intermediate layer which is an in-plane magnetized film with rare earth preference is added.

On the other hand, in the case of an intermediate layer which is an in-plane magnetized film with transition metal preference, the magnetic wall energy is reduced as the temperature rises. However, a change of magnetization with rising of the temperature is so small that the shrinking force of a magnetic wall around a recording magnetic domain decreases with reduction of the magnetic wall energy. Accordingly, it is possible to restrain the shrinking force of the magnetic wall by adding the in-plane magnetized film intermediate layer with transition metal preference to the reading layer with rare earth preference. Consequently, it is possible to move the magnetic wall from the transfer area to the extension area having no influence of the magnetization of the recording layer. It is therefore possible to read recording marks, thereby extending the recording marks in the reading layer.

The magnetization of the intermediate layer is preferably set to be not smaller than 150 emu/cc but not larger than 350 emu/cc at room temperature in the case of transferring by the exchange coupling, while it is preferably set to be not smaller than 300 emu/cc in the case of transferring by the magneto-static coupling connection. That is, with respect to the composition of the intermediate layer, in the case of GdFe, transferring can be made by the exchange coupling when the Gd content has a value which is not smaller than 15 at % but not larger than 20 at %, while transferring can be made by the magneto-static coupling connection when the Gd content is not smaller than 8 at % but not larger than 17 at %. Although the thickness of the intermediate layer depends on the magnetization, the thickness is preferably 5 nm or more in order to control the exchange coupling or the magneto-static coupling connection satisfactorily, and the thickness is preferably 40 nm or less in order to appropriately give the exchange coupling or the magneto-static coupling connection to the reading layer at the time of transferring. Further, for the reproduction properties, more preferably, the thickness is set to be not smaller than 10 nm but not larger than 20 nm in the exchange coupling type, and set to be not smaller than 10 nm but not larger than 30 nm in the magneto-static coupling connection type.

As mentioned above, in order to enable the magnetic wall to move from the transfer area to the extension area, it is necessary to cut off the exchange coupling or the magneto-static coupling connection between the recording layer and the reading layer in the extension area. As an example of a method for realizing this fact, the Curie temperature of the intermediate layer is made to be lower than that of the recording layer. That is, the Curie temperature of the intermediate layer is made to be higher than the temperature (the first predetermined temperature) in which the reading layer changes from an in-plane magnetized film to a perpendicularly magnetized film, and to be lower than the Curie temperature of the recording layer, so that recording marks recorded in the recording layer can be transferred to the reading layer in the transfer area, and magnetic influence from the recording layer to the reading layer can be blocked in the extension area the temperature of which is higher than that of the transfer area. In order to obtain reading properties which are high in reliability and stable, the Curie temperature of the intermediate layer is preferably set to be higher by 30° C. or more than the first predetermined temperature, and lower by 50° C. or more than the Curie temperature of the recording layer. As the intermediate layer having such properties, for example, the composition of the intermediate layer is preferably expressed by $Gd_xFe_{1-x-y}M_y$, where M is a non-magnetic metal element, and the relations of $0.08 \leq x \leq 0.20$, and $0 \leq y \leq 0.15$ are satisfied. In this case, if the recording layer is of TbFeCo, the Curie temperature of the recording layer can be made to be higher than the Curie temperature of the intermediate layer by suitably adjusting the Co content within a range of from 5 atomic % to 25 atomic %.

As another method to cut off the exchange coupling or the magneto-static coupling connection between the recording layer and the reading layer, a cut-off layer for cutting off the exchange coupling or the magneto-static coupling connection is added. That is, there is provided a magneto-optical recording medium constituted by at least a reading layer, an intermediate layer, a cut-off layer and a recording layer of a rare-earth transition metal alloy formed on a substrate. The reading layer is an in-plane magnetized film at room temperature, and becomes a perpendicularly magnetized film when the temperature rises. The intermediate layer is an in-plane magnetized film with transition metal preference. The cut-off layer is a perpendicularly magnetized film the Curie temperature of which is higher than the above-mentioned first predetermined temperature but lower than the Curie temperature of the recording layer. The recording layer is a perpendicularly magnetized film. In order to obtain reading properties which are high in reliability and stable, the Curie temperature of the cut-off layer is preferably higher by 30° C. or more than the first predetermined temperature, and lower by 50° C. or more than the Curie temperature of the recording layer. When the cut-off layer is added as described above, it is particularly preferable that the composition of the intermediate layer is expressed by $Gd_xFe_{1-x}$, satisfying $0.10 \leq x \leq 0.20$, while the Curie temperature of the cut-off layer is 100° C. or more, and lower by 50° C. or more than the Curie temperature of the recording layer.

The cut-off layer is not particularly limited so long as it is made from a rare earth transition metal alloy and it is a perpendicularly magnetized film. However, it is preferable that the magnetic coercive force is larger at room temperature in the same manner as in the recording layer. Therefore, it is preferable to use materials obtained by reducing the Co content of TbFeCo or DyFeCo suitably, or other materials in which the Curie temperature is decreased by means of additive elements such as Cr, Ti, Zr, Nb, Ta, Al, Si, etc. The thickness of the cut-off layer is preferably set to be not smaller than 5 nm but not larger than 30 nm.

Figure 3:
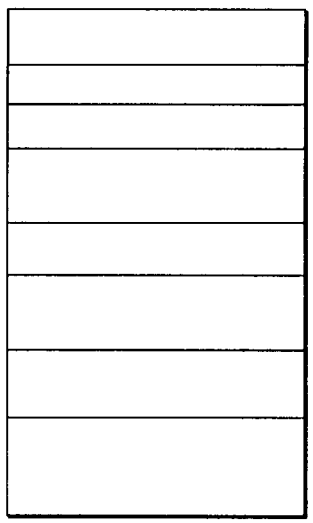
FIG. 3 is a sectional view showing an example of a lamination structure of a magneto-optical recording medium according to the present invention.

The medium structure is not particularly limited so long as it has at least a reading layer, an intermediate layer and a recording layer which are made from a rare earth transition metal alloy and provided on the substrate. However, a structure in which a dielectric layer 32, a reading layer 33, an intermediate layer 34, a recording layer 35, a dielectric layer 36, a thermal diffusion layer 37, and a resin protective layer 38 are laminated successively on a substrate 31 as shown in FIG. 3 is shown as a typical example. The substrate 31 is constituted by a transparent substrate of resin such as polycarbonate or the like, glass, etc. The dielectric layer 32 of a dielectric material such as SiNx, AlN, SiOx, or the like, has a function to increase the Kerr rotation angle, and protect the reading layer 33 physically. The dielectric layer 36 is also made from a material similar to that in the dielectric layer 32 and acts to protect the recording layer 35 physically, and control the flow of heat to the thermal diffusion layer 37 and the resin protective layer 38. The thermal diffusion layer 37 is made from a material consisting of Al, Cu, Ag, or Au, or from the above material to which another material consisting of any of corrosion-resistant elements such as Cr, Ti, Zr, Nb, Ta, or the like, is added. The thermal diffusion layer 37 performs adjustment on the sensitivity and the temperature distribution by the heat radiation operation at the time of recording or reading. The thermal diffusion layer 37 may be excluded. The resin protective layer 38 made from ultraviolet-curing resin or the like, acts to protect the thin films.

Figure 4:
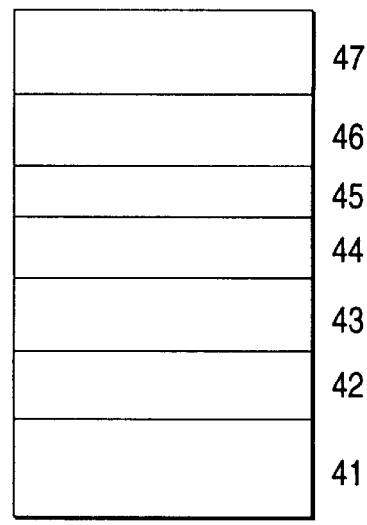
FIG. 4 is a sectional view showing another example of a lamination structure of a magneto-optical recording medium according to the present invention.

The thin films are laminated in the order shown in FIG. 3 when light enters through the substrate. On the other hand, when light enters from an upper layer portion of the thin films, a typical example is structure in which a thermal diffusion layer 42, a dielectric layer 43, a recording layer 44, an intermediate layer 45, a reading layer 46, and a dielectric layer 47 are laminated successively on a substrate 41 as shown in FIG. 4. In this case, the substrate 41 is not required to be transparent, and it may be such a substrate in which a guide groove is formed from ultraviolet-curing resin on an aluminum substrate or on an aluminum plate by a 2P method. When light enters without passing the substrate, it is possible to use an optical head such as a Solid Immersion Lens or the like, in which the numerical aperture of an objective lens is improved. In that case, higher content recording can be realized. These things may apply to the case of a magneto-optical recording medium further including a cut-off layer as mentioned above.

The present invention is described below in more detail by reference to the following Examples, but it should be understood that the invention is not construed as being limited thereto.

EXAMPLE 1 AND COMPARATIVE EXAMPLE 1

A dielectric layer 32 of SiN was formed to a 65 nm thickness on a polycarbonate (PC) substrate 31 in which the track pitch between a land and a groove was 0.7 micron and in which recording could be made both in the land and in the groove, by magnetron sputtering. Then, a reading layer 33 of $Gd_{0.33}Fe_{0.53}Co_{0.14}$ which had a Curie temperature at not lower than 350° C. was formed to a 30 nm thickness. An intermediate layer 34 of $Gd_{0.18}Fe_{0.82}$ which had a Curie temperature at 280° C., which was an in-plane magnetized film with transition metal preference, and which had the saturation magnetization of 250 emu/cc was formed to a 13 nm thickness. A recording layer 35 of $Tb_{0.22}Fe_{0.62}Co_{0.16}$ which was a perpendicularly magnetized film and which had a Curie temperature of 310° C. was formed to a 70 nm thickness. A dielectric layer 36 of SiN was formed to a 30 nm thickness. A thermal diffusion layer 37 of an Al alloy was formed to a 20 nm thickness. These films were laminated successively so as to form such a disk as shown in FIG. 3.

Further, another disk was formed as Comparative Example 1. The disk had the same structure as in Example 1, except for the intermediate layer 34 of $Gd_{0.40}Fe_{0.60}$ which was an in-plane magnetized film with rare earth preference, and which had a Curie temperature at 220° C. and the saturation magnetization of 250 emu/cc was formed to a 15 nm thickness.

Recording was performed by using 680 nm laser light (NA=0.55 of an objective lens) with a recording frequency of 12.5 MHz, a pulse width of 25 nsec, and the rotation speed of 2,400 rpm so that the mark length was 0.3 micron (regarded as half a mark pitch) in the radial position of 30 mm in the manufactured disk. A magnetic field of 300 Oe was applied at the time of recording. The carrier to noise ratio (C/N) was measured by using the same light, while the reading laser power was made to be in a range of from 1 to 3.6 mW. The reading magnetic field was made to be −50 Oe.

Figure 5:
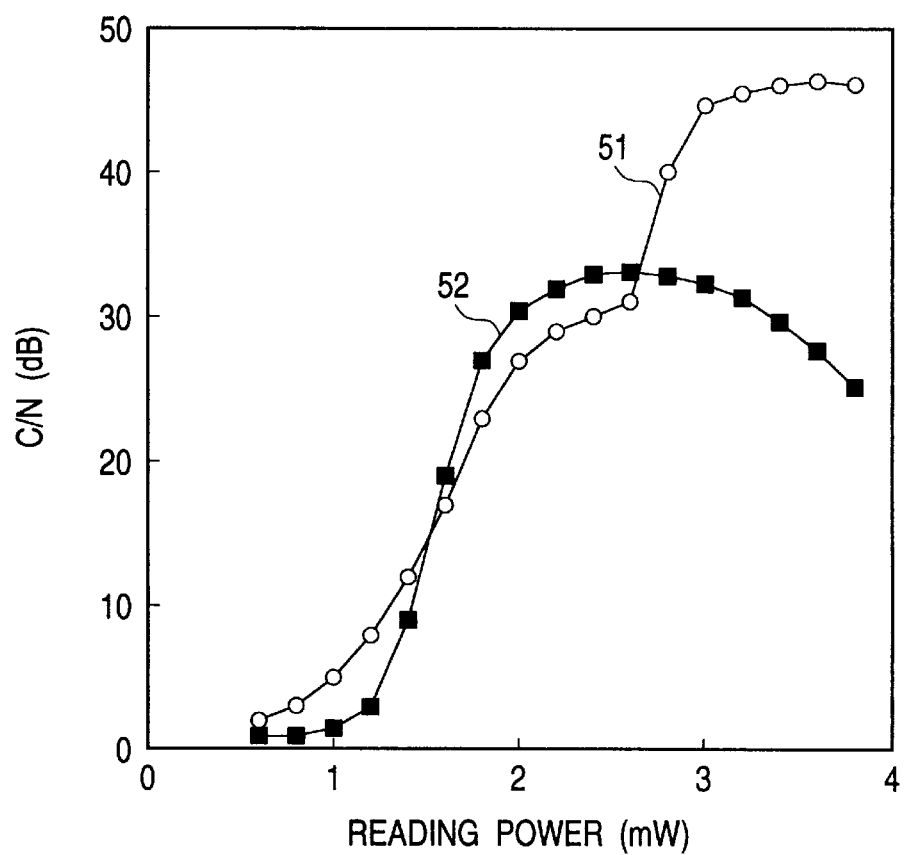
FIG. 5 is a graph showing the reading power dependency of C/N in disks in Example 1 and Comparative Example 1.
Figure 6:
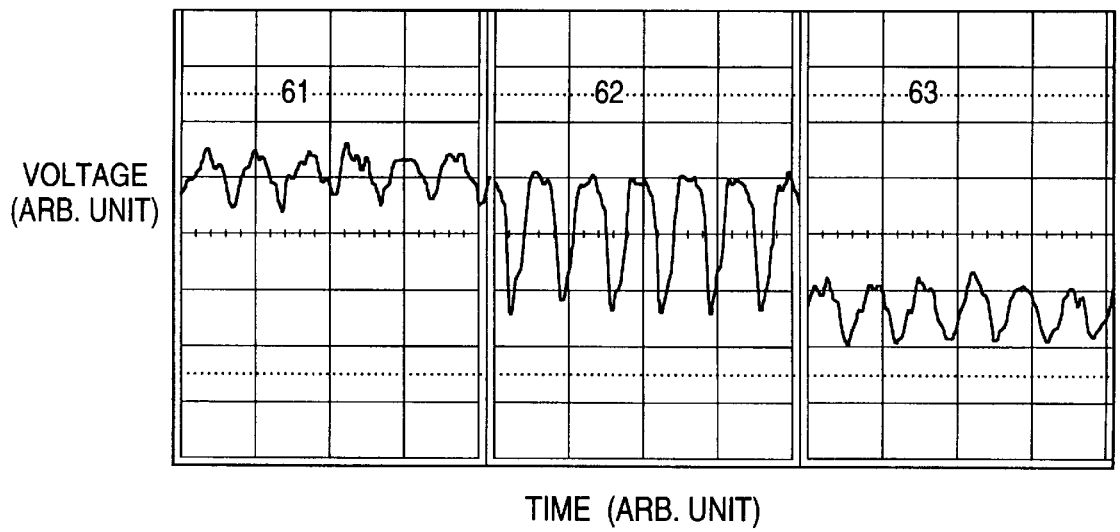
FIG. 6 is a graph showing a readout waveform when writing was performed at 12.5 MHz on the disk in Example 1, and reading was performed with reading power of 3.4 mW.

FIG. 5 shows the reading power dependency of C/N in the disks in Example 1 and Comparative Example 1 (51: Example 1, and 52: Comparative Example 1). In either disk, it is understood that C/N increased with the increase of the reading power, and the transfer area got larger gradually. In Example 1, C/N was once saturated at about 30 dB near 2.5 mW, but rose in suddenly at 2.8 mW, so that C/N of 46 dB at the maximum was obtained. On the other hand, in Comparative Example 1, C/N was saturated near 2.3 mW, so that C/N of 33 dB at its maximum was merely obtained.

Next, the readout waveform of an isolated mark was observed under the condition that only the recording frequency was lowered to 3 MHz with the pulse width of 25 nsec and with the same recording power. As a result, since mark portions became to be in the positive direction, it was found that the direction of spin in the recording layer was the same as that in the reading layer. Accordingly, the transfer of the data on the disk of Example 1 and Comparative Example 1 from the recording layer to the reading layer was performed by the exchange coupling.

Next, writing was performed at 12.5 MHz on the disk in Example 1, reading was performed with a reading power of 3.4 mW while varying the reading magnetic field of from −300 Oe to +300 Oe, and then the readout waveform was observed. A large amplitude whose leading and trailing edges were steep as shown in a readout waveform 62 was obtained within a range of from −90 to −10 Oe. The peak level of the readout waveform was substantially constant as shown in a readout waveform 61 in the reading magnetic field not smaller than −130 Oe, but the bottom level rose so that the amplitude became ¼ or less. On the other hand, beyond +30 Oe the bottom level of the readout waveform was substantially constant as shown in a readout waveform 63 in the reading magnetic field not smaller than +30 Oe, but the peak level dropped so that the amplitude became ¼ or less. This is because the spin of the reading layer is directed upward at the extension area independently of the existence of marks in the transfer area when the reading magnetic field is not smaller than −130 Oe, and the spin of the reading layer is directed downward in the extension area independently of the existence of marks in the transfer area when the reading magnetic field is not smaller than +30 Oe. It was found that the spin in the extension area was directed upward only when a mark in the transfer area abutted against that in the extension area in the reading magnetic field of between −90 and −10 Oe. Accordingly, it was confirmed that the reading method of the present invention was attained.

Next, after erasing continuously over 10 tracks in the land and the groove in the position of 30 mm in the radius, recording was performed in a track on the land near the center by using 680 nm laser light (NA=0.55 of an objective lens) with a recording frequency of 7.5 MHz, a pulse width of 40 nsec, and the rotation speed of 2,400 rpm so that the mark length was 0.5 micron (regarded as half a mark pitch). Examined with the reproduction laser power of 3.4 mW, the carrier level in the recorded track was −20 dB. In addition, the average carrier level in the grooves adjacent to the recorded track was −55 dB. Therefore, crosstalk was −35 dB in the track pitch of 0.7 micron. Accordingly, it was found that the value of crosstalk was sufficient over a practical use level of −25 dB.

EXAMPLE 2

A dielectric layer 32 of SiN was formed to a 65 nm thickness on a polycarbonate (PC) substrate 31 in which the track pitch between a land and a groove was 0.7 micron and in which recording could be made both in the land and in the groove by magnetron sputtering. Then, a reading layer 33 of $Gd_{0.33}Fe_{0.53}Co_{0.14}$ which had a Curie temperature at not lower than 350° C. was formed to a 30 nm thickness. An intermediate layer 34 of $Gd_{0.13}Fe_{0.79}Si_{0.08}$ which had a Curie temperature at 250° C., which was an in-plane magnetized film with transition metal preference, and which had the saturation magnetization of 350 emu/cc was formed to a 15 nm thickness. A recording layer 35 of $Tb_{0.22}Fe_{0.64}Co_{0.14}$ which was a perpendicularly magnetized film and which had a Curie temperature of 290° C. was formed to a 70 nm thickness. A dielectric layer 36 of SiN was formed to a 30 nm thickness. A thermal diffusion layer 37 of an Al alloy was formed to a 20 nm thickness. These films were laminated successively so as to form such a disk as shown in FIG. 3.

Next, C/N was measured in the same manner as in Example 1. The reading magnetic field was set to −30 Oe.

Figure 7:
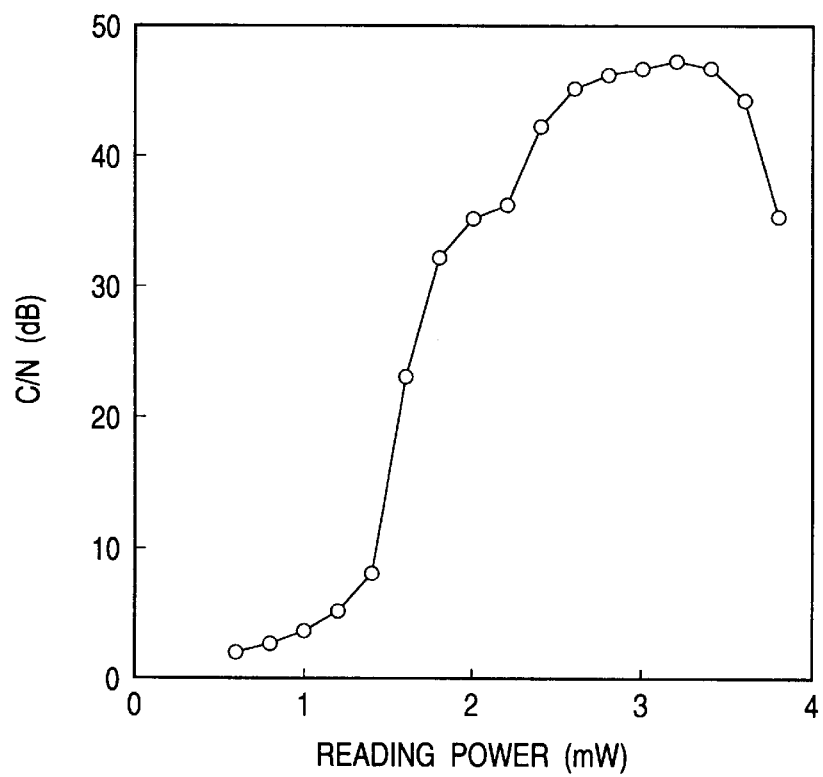
FIG. 7 is a graph showing reading the power dependency of C/N in a disk in Example 2.

FIG. 7 shows the reading power dependency of C/N in the disk in Example 2. In this disk, C/N was extremely small so as to be not larger than 10 dB, when the reading power was not larger than 1.5 mW, and once saturated at about 30 dB near 2.0 mW, but rose suddenly at 2.4 mW so that C/N of 47 dB at maximum was obtained.

Next, the readout waveform of an isolated mark was observed under the condition that only the recording frequency was lowered to 3 MHz with the pulse width 25 nsec and with the same recording power. As a result, since mark portions became to be in the negative direction, it was found that the direction of spin in the recording layer was reverse to that in the reading layer. Accordingly, the transfer of marks on the disk of Example 2 from the recording layer to the reading layer was performed by the magneto-static coupling connection. On the other hand, in the change of the readout waveform from 2.1 mW to 2.3 mW, the amplitude was increased mainly by a sudden drop of the bottom level. Accordingly, it was confirmed that a magnetic domain was extended to the extension area.

Next, crosstalk was examined with the reading laser power of 2.8 mW in the same manner as in Example 1. The crosstalk was −40 dB. Accordingly, it was found that the value of crosstalk was sufficient over a practical use level of −25 dB.

EXAMPLE 3

Figure 8:
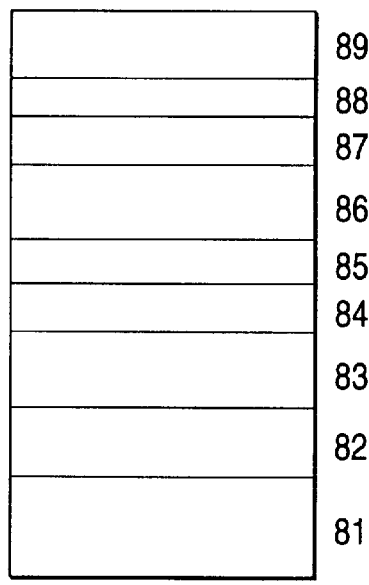
FIG. 8 is a sectional view showing another example of a lamination structure of a magneto-optical recording medium according to the present invention.

A dielectric layer 82 of SiN was formed to a 60 nm thickness on a polycarbonate (PC) substrate 81 in which the track pitch between a land and a groove was 0.7 micron and in which recording could be made both in the land and in the groove by magnetron sputtering. Then, a reading layer 83 of $Gd_{0.33}Fe_{0.53}Co_{0.14}$ which had a Curie temperature at not lower than 350° C. was formed to a 30 nm thickness. An intermediate layer 84 of $Gd_{0.14}Fe_{0.86}$ which had a Curie temperature at 310° C., which was an in-plane magnetized film with transition metal preference, and which had the saturation magnetization of 400 emu/cc, was formed to a 15 nm thickness. A cut-off layer 85 of $Tb_{0.22}Fe_{0.72}Co_{0.06}$ which had a Curie temperature at 230° C., and which was a perpendicularly magnetized film was formed to a 20 nm thickness. A recording layer 86 of $Tb_{0.22}Fe_{0.64}Co_{0.14}$ which was a perpendicularly magnetized film and which had a Curie temperature of 290° C. was formed to a 70 nm thickness. A dielectric layer 87 of SiN was formed to a 40 nm thickness. A thermal diffusion layer 88 of an Al alloy was formed to a 20 nm thickness. These films were laminated successively so as to form such a disk as shown in FIG. 8.

Next, C/N was measured in the same manner as in Example 1. The reading magnetic field was set to −30 Oe.

Figure 9:
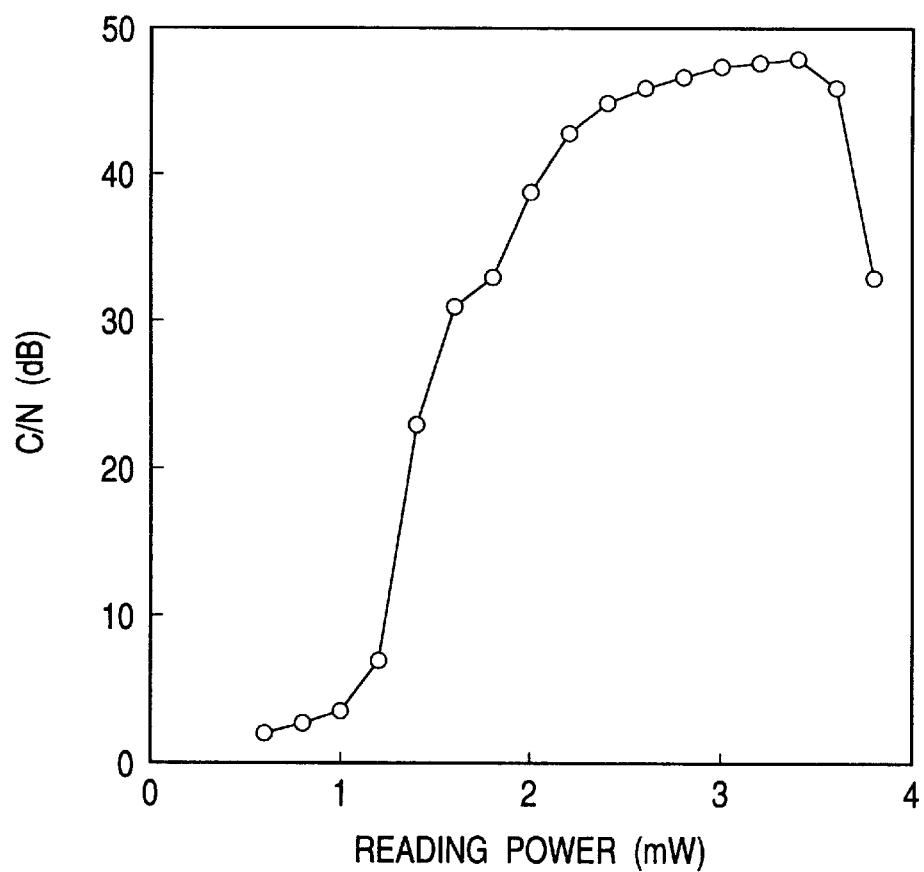
FIG. 9 is a graph showing the reading power dependency of C/N in a disk in Example 3.

FIG. 9 shows the reading power dependency of C/N in the disk in Example 3. In this disk, C/N was extremely small so as to be not larger than 10 dB, when the reading power was not larger than 1.3 mW, and once saturated at about 33 dB near 1.8 mW, but rose suddenly at 2.0 mW so that C/N of 48 dB at maximum was obtained.

Next, the readout waveform of an isolated mark was observed under the condition that only the recording frequency was lowered to 3 MHz with the pulse width of 25 nsec and with the same recording power. As a result, since mark portions became to be in the negative direction, it was found that the direction of spin in the recording layer was reverse to that in the reading layer. Accordingly, the transfer of marks on the disk of Example 3 from the recording layer to the reading layer was performed by the magneto-static coupling connection. On the other hand, in the change of the readout waveform from 1.8 mW to 2.2 mW, the amplitude was increased mainly by a sudden drop of the bottom level. Accordingly, it was confirmed that a magnetic domain was extended to the extension area.

Next, crosstalk was examined with the reading laser power of 2.8 mW in the same manner as in Example 1. The crosstalk was −37 dB. Accordingly, it was found that the value of crosstalk was sufficient over a practical use level of −25 dB.

As is apparent from the above description, information bits recorded at smaller intervals than an optical diffraction limit of reproduction light can be read with a high C/N while they are extended. In addition, crosstalk with adjacent tracks is so small that both the linear content and the track content can be improved.

While the invention has been described in detail and with reference to specific embodiments thereof, it will be apparent to one skilled in the art that various changes and modifications can be made therein without departing from the spirit and scope thereof.

What is claimed is:

1. A magneto-optical recording medium comprising a reading layer, an intermediate layer and a recording layer each of which is made from a rare-earth transition metal alloy and formed on a substrate, wherein said reading layer is an in-plane magnetized film at a lower temperature than a first predetermined temperature, and becomes a perpendicularly magnetized film when the temperature rises to reach or exceed said first predetermined temperature, said intermediate layer is an in-plane magnetized film with transition metal preference, and said recording layer is a perpendicularly magnetized film, and wherein the magnetization of said reading layer is directed to the in-plane direction independently of the direction of the magnetization of said recording layer so that said reading layer becomes a mask in a temperature range lower than said first predetermined temperature, while in an area the temperature of which has reached a temperature which is not lower than said first predetermined temperature but lower than a second predetermined temperature by the temperature rising caused by radiation of a reading laser beam, said reading layer becomes a perpendicularly magnetized film while recording marks recorded in said recording layer are transferred to said reading layer, and said recording marks transferred to said reading layer are further extended to said reading layer which is in an area the temperature of which has been risen to a temperature not lower than said second predetermined temperature.

2. A magneto-optical recording medium comprising a reading layer, an intermediate layer and a recording layer each of which is made from a rare-earth transition metal alloy and formed on a substrate according to claim 1, wherein said reading layer is an in-plane magnetized film at a temperature lower than the first predetermined temperature, while becomes a perpendicularly magnetized film when the temperature rises to or exceeds said first predetermined temperature, said intermediate layer is an in-plane magnetized film with transition metal preference, the Curie temperature of said intermediate layer being higher than said first predetermined temperature, but lower than the Curie temperature of said recording layer.

3. A magneto-optical recording medium according to claim 2, wherein said reading layer is an alloy comprising GdFeCo as a main component with rare earth preference, and the composition of said intermediate layer is expressed by $Gd_xFe_{1-x-y}M_y$ (M is a non-magnetic metal element), satisfying $0.08 \leq x \leq 0.20$, and $0 \leq y \leq 0.15$.

4. A magneto-optical recording medium according to claim 2, wherein in an area the temperature of which has reached a temperature not lower than the first predetermined temperature but lower than the second predetermined temperature by the temperature rising caused by radiation of a reading laser beam, the recording marks recorded in said recording layer are transferred to said reading layer by an exchange coupling force from said recording layer.

5. A magneto-optical recording medium according to claim 2, wherein in an area the temperature of which has reached a temperature not lower than the first predetermined temperature but lower than the second predetermined temperature by the temperature rising caused by radiation of a reading laser beam, the recording marks recorded in said recording layer are transferred to said reading layer by a magneto-static force from said recording layer.

6. A magneto-optical recording medium according to claim 1, wherein the recording layer has a Curie temperature, which magneto-optical recording medium further comprises a cut-off layer which is a perpendicularly magnetized film and which has a Curie temperature, the Curie temperature of said cut-off layer being higher than said first predetermined temperature but lower than the Curie temperature of said recording layer.

7. A magneto-optical recording medium according to claim 6, wherein said reading layer is an alloy comprising GdFeCo as a main component with rare earth preference, and the composition of said intermediate layer is expressed by $Gd_xFe_{1-x-y}M_y$ (M is a non-magnetic metal element), satisfying $0.08 \leq x \leq 0.20$, and $0 \leq y \leq 0.15$, while the Curie temperature of said cut-off layer is not lower than 100° C., but lower than the Curie temperature of said recording layer by 50° C. or more.

8. A magneto-optical recording medium according to claim 6, wherein in an area the temperature of which has reached a temperature not lower than the first predetermined temperature but lower than the second predetermined temperature by the temperature rising caused by radiation of a reading laser beam, the recording marks recorded in said recording layer are transferred to said reading layer by an exchange coupling force from said recording layer.

9. A magneto-optical recording medium according to claim 6, wherein in an area the temperature of which has reached a temperature not lower than the first predetermined temperature but lower than the second predetermined temperature by the temperature rising caused by radiation of a reproduction laser beam, the recording marks recorded in said recording layer are transferred to said reading layer by a magneto-static force from said recording layer.

10. A method of reading a magneto-optical recording medium, wherein, in an area the temperature of which is lower than a first predetermined temperature, the magnetization of a reading layer is directed to the in-plane direction independently of the direction of the magnetization of a recording layer so that said reading layer becomes a mask for recording marks recorded in said recording layer in advance, while in an area the temperature of which has been risen to a temperature not lower than the first predetermined temperature but lower than a second predetermined temperature by radiation of a reading laser beam, said reading layer is made a perpendicularly magnetized film, thereby said recording marks recorded in said recording layer are transferred to said reading layer, and said recording marks transferred to said reading layer are further extended to said reading layer which is in an area the temperature of which has been risen to a temperature not lower than said second predetermined temperature to thereby obtain a readout signal.

11. A magneto-optical recording medium accoding to claim 1, wherein said second predetermined temperature is equal to or close to the Curie temperature of the intermediate layer.

* * * * *